US010572802B1

(12) United States Patent
Sun et al.

(10) Patent No.: US 10,572,802 B1
(45) Date of Patent: Feb. 25, 2020

(54) LEARNING STATE-DEPENDENT SENSOR MEASUREMENT MODELS FOR LOCALIZATION

(71) Applicants: Yu Sun, Tampa, FL (US); Troi Williams, Tampa, FL (US)

(72) Inventors: Yu Sun, Tampa, FL (US); Troi Williams, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/236,715

(22) Filed: Dec. 31, 2018

Related U.S. Application Data

(60) Provisional application No. 62/767,581, filed on Nov. 15, 2018.

(51) Int. Cl.
*G06N 3/04* (2006.01)
*G06N 3/08* (2006.01)
*G06N 7/00* (2006.01)

(52) U.S. Cl.
CPC .............. *G06N 3/08* (2013.01); *G06N 3/0454* (2013.01); *G06N 7/005* (2013.01)

(58) Field of Classification Search
CPC .......... G06N 3/02; G06N 3/0454; G06N 3/08; G06N 7/005
See application file for complete search history.

(56) References Cited

U.S. PATENT DOCUMENTS

| | | | |
|---|---|---|---|
| 6,108,597 A | 8/2000 | Kirchner et al. | |
| 9,653,093 B1* | 5/2017 | Matsoukas | G10L 15/08 |
| 2004/0249504 A1* | 12/2004 | Gutmann | G05D 1/0231 |
| | | | 700/245 |
| 2016/0005391 A1* | 1/2016 | Agiomyrgiannakis | |
| | | | G10L 13/02 |
| | | | 704/260 |
| 2017/0004406 A1* | 1/2017 | Aghamohammadi | |
| | | | G06N 5/045 |
| 2018/0067558 A1* | 3/2018 | Eagleman | G08B 1/08 |

OTHER PUBLICATIONS

P. Alriksson; et al (2006) "Distributed Kalman Filtering Using Weighted Averaging," in Proc. 17th Int. Symp. Math. Theory Netw. Syst., Kyoto, Japan.
B. M. Bell; et al (1993) "The Iterated Kalman Filter Update as a Gauss-Newton Method," IEEE Trans. Autom. Control, vol. 38, No. 2, pp. 294-297.
C. Belta; et al (2004) "Abstraction and Control for Groups of Robots," IEEE Trans. Robotics, vol. 20, No. 5, pp. 865-875.
R. R. Brooks,; et al (2003) "Distributed Target Classification and Tracking in Sensor Networks," Proc. IEEE, vol. 91, No. 8, pp. 1163-1171.

(Continued)

*Primary Examiner* — Hal Schnee
(74) *Attorney, Agent, or Firm* — Thomas | Horstemeyer, LLP (57) ABSTRACT

A noise and bias can be determined for a sensor. An input vector can be received. A parameter vector can be generated based at least in part on a feed-forward neural network. Components can be determined using the parameter vector based at least in part on a mixture model. A conditional probability density function can be generated based at least in part on the conditional probability density function.

20 Claims, 7 Drawing Sheets

(56) References Cited

OTHER PUBLICATIONS

J. P. Le Cadre; et al (1999) "On the Convergence of Iterative Methods for Bearing-Only Tracking," IEEE Trans. Aerosp. Electron. Syst., vol. 35, No. 3, pp. 801-818.

J. Cao; et al (2008) "Global Synchronization in an Array of Delayed Neural Networks With Hybrid Coupling," IEEE Trans. Syst., Man, Cybern., Part B, vol. 38, No. 2, pp. 488-498.

R. Carli; et al (2008) "Distributed Kalman Filtering Based on Consensus Strategies," IEEE J. Sel. Areas Commun., vol. 26, No. 4, pp. 622-633.

F. S. Cattivelli; et al (2010) "Diffusion LMS Strategies for Distributed Estimation," IEEE Trans. Signal Process., vol. 58, No. 3, pp. 1035-1048.

L. Chai; et al (2008) "Distributed State Estimation Based on Quantized Observations in a Bandwidth Constrained Sensor Network," in Proc. 7th World Congr. Intell. Control Autom., Chongqing, China, pp. 2411-2415.

T. H. Chung; et al (2004) "On a Decentralized Active Sensing Strategy Using Mobile Sensor Platforms in a Network," in Proc. IEEE Conf. Decision Control, Paradise Island, Bahamas, pp. 1914-1919.

J. Cortés; et al (2004) "Coverage Control for Mobile Sensing Networks," IEEE Trans. Robot. Autom., vol. 20, No. 2, pp. 243-255.

M. Farina; et al (2009) "Distributed Moving Horizon Estimation for Sensor Networks," in Proc. 1st IFAC Workshop Estim. Control Netw. Syst., Venice, Italy, pp. 126-131.

M. Farina; et al (2009) "A Moving Horizon Scheme for Distributed State Estimation," in Proc. 48th IEEE Conf. Decis. Control, Shanghai, China, pp. 1818-1823.

A. Farina, (1999) "Target Tracking With Bearings-Only Measurements," Signal Processing, vol. 78, pp. 61-78.

J. A. Fax; et al (2004) "Information Flow and Cooperative Control of Vehicle Formations," IEEE Trans. Autom. Control, vol. 49, No. 9, pp. 1465-1476.

R. A. Freeman; et al (2006) "Distributed Estimation and Control of Swarm Formation Statistics," in Proc. Amer. Control Conf., Minneapolis, MN, pp. 749-755.

A. Gadre,; et al (2008) "Sensor Error Model for a Uniform Linear Array," VaCAS, Tech. Rep.,http://www.unmanned.vt.edu/discovery/reports/VaCAS_2008_01.pdf.

H. Gao; et al (2007) "H8 Estimation for Uncertain Systems With Limited Communication Capacity," IEEE Trans. Autom. Control, vol. 52, No. 11, pp. 2070-2084.

H. Gao; et al (2007) "Discrete Bilinear Stochastic Systems With Time-Varying Delay: Stability Analysis and Control Synthesis," Chaos, Solitons Fractals, vol. 34, No. 2, pp. 394-404.

Gibson, J.D.; et al (1991) "Filtering of Colored Noise for Speech Enhancement and Coding." IEEE Trans. Sign. Process. 1732-1742.

Ho, L.; et al (2005) "A Prototype on RFID and Sensor Networks for Elder Healthcare: Progress Report." In Proceedings of ACM SIGCOMM Workshop on Experimental Approaches to Wireless Network Design and Analysis, Philadelphia, PA, USA pp. 70-75.

R. A. Iltis; et al (1996) "A Consistent Estimation Criterion for Multisensor Bearing-Only Tracking," IEEE Trans. Aerosp. Electron. Syst., vol. 32, No. 1, pp. 108-120.

K. Ito; et al (2000) "Gaussian Filters for Nonlinear Filtering Problems," IEEE Trans. Autom. Control, vol. 45, No. 5, pp. 910-927.

S. J. Julier; et al (1997) "A New Extension of the Kalman Filter to Nonlinear Systems," in Proc. SPIE Int. Symp. Aerosp./Defense Sens., Simul., Controls, pp. 182-193.

J. Julier; et al (2000) "A New Method for the Nonlinear Transformation of Means and Covariances in Filters and Estimators," IEEE Trans. Autom. Control, vol. 45, No. 3, pp. 477-482.

M. Kamgarpour; et al (2008) "Convergence Properties of a Decentralized Kalman Filter," in Proc. 47th IEEE Conf. Decis. Control, Cancun, Mexico, pp. 3205-3210.

J.-H. Kim; et al (2008) "Multiscale Consensus for Decentralized Estimation and Its Application to Building Systems," in Proc. Amer. Control Conf., Seattle, WA, pp. 888-893.

T. Lefebvre; et al (2002) "Comment on 'A New Method for the Nonlinear Transformation of Means and Covariances in Filters and Estimators'," IEEE Trans. Autom. Control, vol. 47, No. 8, pp. 1406-1408.

T. Lefebvre; et al (2004) "Kalman Filters for Nonlinear Systems: A Comparison of Performance," Int. J. Control, vol. 77, No. 7, pp. 639-653.

X. R. Li; et al (2001) "A Survey of Maneuvering Target Tracking—Part III: Measurement Models," in Proceedings of SPIE Conference on Signal and Data Processing of Small Targets, San Diego, CA, p. 4473-41.

J. Liang; et al (2009) "State Estimation for Coupled Uncertain Stochastic Networks With Missing Measurements and Time-Varying Delays: The Discrete-Time Case," IEEE Trans. Neural Netw., vol. 20, No. 5, pp. 781-793.

C. Lin; et al (2009) "Observer-Based Networked Control for Continuous-Time Systems With Random Sensor Delays," Automatica, vol. 45, No. 2, pp. 578-584.

Y. Liu; et al (2008) "Synchronization and State Estimation for Discrete-Time Complex Networks With Distributed Delays," IEEE Trans. Syst., Man Cybern., Part B, vol. 38, No. 5, pp. 1314-1325.

A. Logothetis; et al (1997) "An Information Theoretic Approach to Observer Path Design for Bearings-Only Tracking," in Proc. 36th Conf. Decision Control, San Diego, CS, pp. 3132-3137.

A. Logothetis; et al (1996) "Comparison of Suboptimal Strategies for Optimal Own-Ship Maneuvers in Bearing-Only Tracking,"in Proc. Amer. Control Conf., Philadelphia, PA, pp. 3334-3338.

W. Lu; et al (2009) "Synchronisation in Complex Networks of Coupled Systems With Directed Topologies," Int. J. Syst. Sci., vol. 40, No. 9, pp. 909-921.

S. Martínez; et al (2006) "Optimal Sensor Placement and Motion Coordination for Target Tracking," Automatica, vol. 42, No. 4, pp. 661-668.

S. Mou; et al (2008) "New Delay-Dependent Exponential Stability for Neural Networks with Time Delay," IEEE Trans. Syst., Man, Cybern., Part B, vol. 38, No. 2, pp. 571-576.

S. Mou; et al (2008) "Further Improvement on Synchronization Stability of Complex Networks with Coupling Delays," Int. J. Comput. Math., vol. 85, No. 8, pp. 1255-1263.

N. Nahi (1969) "Optimal Recursive Estimation with Uncertain Observation," IEEE Trans. Inf. Theory, vol. 15, No. 4, pp. 457-462.

M. Nørgaard; et al (2000) "New Developments in State Estimations for Nonlinear Systems," Automatica, vol. 36, No. 11, pp. 1627-1638.

Okatan, A.; et al (2009) "Fault Detection in Sensor Information Fusion Kalman Filter." Int. J. Electron. Commun. 63, 762-768.

R. Olfati-Saber; et al (2005) "Consensus Filters for Sensor Networks and Distributed Sensor Fusion," in Proc. 44th IEEE Conf. Decis. Control, Eur. Control Conf., Seville, Spain, pp. 6698-6703.

R. Olfati-Saber, "Distributed Kalman Filtering for Sensor Networks," in Proc. 46th IEEE Conf. Decis. Control, New Orleans, LA, pp. 1-7.

Y. Oshman (1999) "Optimization of Observer Trajectories for Bearings-Only Target Localization," IEEE Trans. Aerosp. Electron. Syst., vol. 35, No. 3, pp. 892-902.

Pesonen, N.; et al (2009) "Smart RFID Tags." in Development and Implementation of RFID Technology; Turcu, C., Ed.; InTech: Rijeka, Croatia; pp. 159-178.

M. Porfiri; et al (2007) "Tracking and Formation Control of Multiple Autonomous Agents: A Two-Level Consensus Approach," Automatica, vol. 43, No. 8, pp. 1318-1328.

F. S. Cattivelli; et al (2010) "Diffusion Strategies for Distributed Kalman Filtering and Smoothing," IEEE Trans. Autom. Control, vol. 55, No. 9, pp. 2069-2084.

B. Shen; et al (2008) "On Nonlinear H8 Filtering for Discrete-Time Stochastic Systems With Missing Measurements," IEEE Trans. Autom. Control, vol. 53, No. 9, pp. 2170-2180.

T. Schei, "A Finite-Difference Method for Linearisation in Nonlinear Estimation Algorithms," Automatica, vol. 33, No. 11, pp. 2053-2058.

(56) References Cited

OTHER PUBLICATIONS

H. Liu; et al (2004) "Design of Reduced-Order H8 Filter for Markovian Jumping Systems With Time Delay" IEEE Transactions on Circuits and Systems—II: Express Briefs, vol. 51, No. 11.
A. S. Gadre; et al (2008) "Cooperative Localization of an Acoustic Source using Towed Hydrophone Arrays" IEEE.
R. E. Kalman; et al (1960) "A New Approach to Linear Filtering and Prediction Problems1" Transactions of the ASME—Journal of Basic Engineering, 82 (Series D): 35-45.
W. Ding; et al (2007) "Improving Adaptive Kalman Estimation in GPS/INS Integration" The Journal of Navigation (2007), 60, 517-529.
P. Shi; et al (2006) "Robust Filtering for Jumping Systems With Mode-Dependent Delays," Signal Process., vol. 86, No. 1, pp. 140-152.
G. Sibley; et al (2006) "The Iterated Sigma Point Kalman Filter With Application to Long Range Stereo," in Proc. Robot.: Sci. Syst., Philadelphia, PA, http://www.roboticsproceedings.org/rss02/p34.html.
S. Simic; et al (2003) "Distributed environmental monitoring Using Random Sensor Networks," in Proc. 2nd Int. Workshop Inform. Processing Sensor Networks, Palo Alto, CA, pp. 582-592.
B. Sinopoli; et al (2004) "Kalman Filtering With Intermittent Observations," IEEE Trans. Autom. Control, vol. 49, No. 9, pp. 1453-1464.
D. P. Spanos; et al (2005) "Approximate Distributed Kalman Filtering in Sensor Networks With Quantifiable Performance," in Proc. 4th Int. Symp. Inf. Process. Sens. Netw., pp. 133-139.
A. Speranzon; et al (2008) "A Distributed Minimum Variance Estimator for Sensor Networks," IEEE J. Sel. Areas Commun., vol. 26, No. 4, pp. 609-621.
D. Spinello; et a; (2008) "Nonlinear Estimation With State-Dependent Gaussian Observation Noise," VaCAS, Tech. Rep. 2, http://www.unmanned.vt.edu/discovery/reports/VaCAS_2008_02.pdf.
S. Susca; et al (2006) "Monitoring Environmental Boundaries With a Robotic Sensor Network," in Proc. Amer. Control Conf., pp. 2072-2077.
Y. Tang; et al (2010) "Impulsive Pinning Synchronization of Stochastic Discrete-Time Networks," Neurocomputing, vol. 73, Nos. 10-12, pp. 2132-2139.
S. Thrun; et al (2004) "Simultaneous Localization and Mapping With Sparse Extended Information Filters," Int. J. Robot. Res., vol. 23, No. 7-8, pp. 693-716.
X. F. Wang; et al (2002) "Synchronization in Scale-Free Dynamical Networks: Robustness and Fragility," IEEE Trans. Circuits Syst. I: Fundam. Theory Appl., vol. 49, No. 1, pp. 54-62.
Z. Wang; et al (2009) "Robust H8 Control for a Class of Nonlinear Discrete Time-Delay Stochastic Systems With Missing Measurements," Automatica, vol. 45, No. 3, pp. 684-691.
Z. Wang; et al (2010) "Global Synchronization for Discrete-Time Stochastic Complex Networks With Randomly Occurred Nonlinearities and Mixed Time Delays," IEEE Trans. Neural Netw., vol. 21, No. 1, pp. 11-25.
Z.Wang; et al (2005) "Robust Finite-Horizon Filtering for Stochastic Systems With Missing Measurements," IEEE Signal Processing Lett., vol. 12, No. 6, pp. 437-440.
Y. Wang; et al (2009) "Global Synchronization for Delayed Complex Networks With Randomly Occurring Nonlinearities and Multiple Stochastic Disturbances," J. Phys. A: Math. Theor., vol. 42, No. 13, pp. 135101-1-135101-19.
Welch, G.; et al (1995) "An Introduction to the Kalman Filter; Technical Report 95 041" Department of Computer Science, University of North Carolina: Chapel Hill, NC, USA.
L. Wu; et al (2008) "H8 Filtering for 2-D Markovian Jump Systems," Automatica, vol. 44, No. 7, pp. 1849-1858.
J. Xiong; et al (2006) "Fixed-Order Robust H8 Filter Design for Markovian Jump Systems With Uncertain Switching Probabilities," IEEE Trans. Signal Process., vol. 54, No. 4, pp. 1421-1430.
Z. Xiong; et al (2004) "Distributed Source Coding for Sensor Networks," IEEE Signal Process. Mag., vol. 21, No. 5, pp. 80-94.
F. Yang; et al (2006) "Robust Mixed H2/H8 Control for a Class of Nonlinear Stochastic Systems," IEE Proc., Control Theory Appl., vol. 153, No. 2, pp. 175-184.
P. Yang; et al (2007) "Distributed Cooperative Active Sensing Using Consensus Filters," in Proc. IEEE Int. Conf. Robot. Autom., Roma, Italy, pp. 405-410.
Yu, D.L.; et al (2005) "Adaptive Neural Model-Based Fault Tolerant Control for Multi-Variable Processes." Eng. Appl. Artif. Intell., 18, 393-411.
W. Yu; et al (2009) "Distributed Consensus Filtering in Sensor Networks," IEEE Trans. Syst., Man, Cybern, Part B, vol. 39, No. 6, pp. 1568-1577.
M. Zakai, "On the Optimal Filtering of Diffusion pProcesses," Zeitschrift Fur Wahrscheinlichkeitstheorie Und Verwandte Gebiete, vol. 11, pp. 230-243.
R. Zhan; et al (2007) "Iterated Unscented Kalman Filter for Passive Target Tracking," IEEE Trans. Aerosp. Electron. Syst., vol. 43, No. 3, pp. 1155-1163.
H. Zhang; et al (2006) "H8 Filtering for Multipletime-Delay Measurements," IEEE Trans. Signal Process., vol. 54, No. 5, pp. 1681-1688.
K. X. Zhou; et al (2006) "Optimal Motion Strategies for Rangeonly Distributed Target Tracking," in Proc. Amer. Control Conf., Minneapolis, MN, pp. 5195-5200.
Ki Hwan Eom; et al (2011) "Improved Kalman Filter Method for Measurement Noise Reduction in Multi Sensor RFID Systems" Sensors pp. 10266-10282.
Jinling Liang; et al (2011) "Distributed State Estimation for Discrete-Time Sensor Networks with Randomly Varying Nonlinearities and Missing Measurements" IEEE Transactions on Neural Networks, vol. 22, No. 3, pp. 486-496.

* cited by examiner

LEARNING STATE-DEPENDENT SENSOR MEASUREMENT MODELS FOR LOCALIZATION

CROSS-REFERENCE TO RELATED APPLICATIONS

This application claims the benefit of U.S. Provisional Application No. 62/767,581 filed Nov. 18, 2018, the entire contents of which is hereby incorporated herein by reference.

BACKGROUND

In the context of real-world mobile robots, state estimation is the problem of estimating the state of a robot. Typically, states such as the exact location of a robot and the exact locations of obstacles in a robot's environment are not directly observable. However, such states can be inferred from sensor measurements. A robot can rely on sensor measurements to infer its state and the state of its environment. Unfortunately, sensor measurements can be noisy and the amount of noise can vary with state. Various methods of estimating and iteratively adapting measurement noise over time can be performed. However, those methods do not assume that measurement noise is stochastic and they do not estimate sensor measurement bias and noise based on state. It would be preferable to estimate noise and bias based on state of the robot.

BRIEF DESCRIPTION OF THE DRAWINGS

For a more complete understanding of the embodiments and the advantages thereof, reference is now made to the following description, in conjunction with the accompanying figures briefly described as follows.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

In the context of mobile robotics, state estimation is the problem of determining the state of a robot in its environment. Since robots cannot estimate their states directly, they rely on sensor measurements to infer some information about their states and their environment. Unfortunately, sensor measurements are noisy and the amount of noise can vary with robot and environment states. To lessen the effect noisy measurements have, many researchers have developed techniques that estimate measurement noise and iteratively adapt the estimated noise based on internal information from the robot as it moves throughout an environment. However, these techniques do not learn a sensor's measurement model directly from sensor measurements and, as a result, may not be able to stochastically estimate sensor bias or noise based on varying robot and environment states. In this disclosure, methods are proposed that: 1) learns measurement models directly from sensor measurements in the field and 2) stochastically estimates measurement bias and noise conditioned upon a robot's state and the state of its environment.

Various methods, systems, and mediums can be used to determine a noise and bias for a sensor. A computing device can execute an application to determine the noise and bias. An input vector can be received. A parameter vector can be generated based at least in part on a feed-forward neural network. Components can be determined using the parameter vector based at least in part on a mixture model. A conditional probability density function can be generated based at least in part on the conditional probability density function. The input vector can correspond to a vector encoding information about a state of the robot. The state of the robot can correspond to a computing device, such as a computing device located in the robot. In some embodiments, the one or more computing devices are located remote from the robot while one or more computing devices are located with the robot.

The computing device can generate a map of an environment of the robot. A mixture model can be trained using a collection of sensor measurements and state information about an environment when the collections of measurements were produced. The noise can be Gaussian distributed. The conditional probability density function can be based on an Extended Kalman Filter. The computing device can generate a noise and bias for the sensor based on the conditional probability density function.

I. Introduction

Although sensors play an integral role in estimating the state of a robot, the measurements from the sensors are generally imperfect because the measurements contain some amount of noise. For example, consider a small autonomous, mobile manipulator that uses an onboard camera to measure its bearing to nearby obstacles. Each time such a robot measures its bearing to an obstacle, it can observe a different bearing measurement due to a number of reasons (for instance, imperfections in the robot's camera). This, in turn, can translate into noisy estimates of the robot's state. And noisy state estimates can cause hazardous situations. For example, the robot may estimate that it is further away from an obstacle than it really is and, as a result, can collide with the obstacle. This example illustrates that robots need an estimate of the amount of noise a sensor measurement can have so that they can determine how much they should trust a measurement.

However, simply knowing the general amount of noise a sensor measurement can have is not enough because the amount of noise in measurements can also vary depending on the states of the robot and its environment. For example, a combination of environment lighting and a camera lens imperfection can cause nearby, off-centered obstacles to appear further off to the side than they really are. This, in turn, can produce bearing measurements with high bias and high uncertainty. However, when obstacles are centered and far away, the robot may not experience the same issue as before—therefore, the robots measurements may have relatively less bias and less uncertainty. This example implies that simply knowing the general amount of measurement noise is not enough. Instead, a robot must be able to estimate the bias and confidence of each measurement given its state and the state of the environment.

In the context of mobile robots, robots can employ algorithms called filters to predict their states as they move in an environment and to infer their states from sensor measurements whenever the measurements become available. To predict a robot's state as it moves and to infer its state using measurements, filtering algorithms can use a process model and a measurement model, respectively. The measurement model can be used for the disclosed embodiments. In some embodiments, a focus can be made on the measurement model of the Extended Kalman Filter (EKF). Included is a demonstration of how one can modify an EKF's measurement model to employ a state-dependent sensor measurement model for localization.

The Extended Kalman Filter can use a measurement model to infer a robot's state. The EKF's measurement model is mainly composed of two terms: h(x), the measurement (or output) function, and Q, the covariance of the measurement noise. Generally, h(x) is an a priori, human-derived function that maps a robot's state to a sensor measurement. The output of h(x) is z, which represents a measurement a robot would observe if it had the state x.

Q, the covariance of the measurement noise, quantifies the amount of noise a sensor's measurement contains. Q is can be initialized using several methods. Some methods include: performing sensor calibration; choosing a set of values that are near zero and are adapted later; using trial and error to select an Q that yields the smallest error; and using the least squares estimation to compute the covariance from the residuals between the sensor measurements and the ground truth measurements.

When it comes to using Q in the EKF, different methods can be used for applying the covariance of the measurement noise. In one method, an assumption can be made that assumes Q is constant and does not change while the filter runs. In some applications, a constant Q works. But generally a constant Q can lead to filter divergence. Therefore, Q is typically adapted.

In another method, Q can be adapted as the EKF runs. Several techniques can be used to adapt Q in the EKF. These techniques include Bayesian, Maximum Likelihood based on the innovation, Covariance Matching, and Correlation Techniques, among others. Typically, these methods involve adapting Q based on statistics computed from the EKF's equations. For example, covariance matching maintains a windowed, running average of the residual between a sensor measurement and an expected measurement from h(x).

These methods have at least one of several drawbacks: a) they solely rely on internal filter information to estimate the measurement noise and, therefore, do not directly capture how state correlates with measurement bias or noise; b) they do not stochastically estimate measurement bias and noise; or c) they do not directly estimate measurement bias and noise.

Therefore, methods, systems, and mediums are presented that can be based on state-dependent sensor measurement models, which is a model that can learn to estimate a sensor's measurement probability density function (p.d.f.). Although the disclosed embodiments may be described as a method at times, it is understood that these methods can be implemented in a system, such as on a computing device with a processor and memory, or non-transitory computer-readable medium. The advantages of the disclosed embodiments over the previous methods are: a) it assumes measurement uncertainty is stochastic and can vary with state; b) it can estimate a different measurement probability density function, expected measurement, and expected measurement uncertainty for different states; c) it alleviates the need for precomputing measurement uncertainty; and d) it does not need to run alongside a filter to learn measurement uncertainty and it is filter agnostic. The following contributions can be considered, among others:

Methods for learning a sensor's measurement probability density function, $p(z|\lambda)$, using state-dependent sensor measurement models.

The use of mixture density networks to learn a sensor's measurement p.d.f.

The use of state-dependent sensor measurement models with the Extended Kalman Filter.

Using state-dependent sensor measurement models for localization using the Extended Kalman Filter and a robot dataset.

III. Learning State-Dependent Sensor Measurement Model

A. State-Dependent Sensor Measurement Models

According to various embodiments, state-dependent sensor measurement models can be used to reduce noise and bias. A state-dependent sensor measurement model can be a parametric model that learns to estimate a sensor's measurement probability density function (p.d.f), $p(z|\lambda)$. The input to the model can include the states of the robot (that houses the sensor) and the robot's environment, $\lambda$. The output of the model can be an estimate of a sensor's measurement p.d.f. $p(z|\lambda)$. Since an input state and an output measurement may have different representations, a state-dependent sensor measurement model can also learn to map from a state space to a sensor's measurement space. In addition, for each state $\lambda$ a state-dependent sensor measurement model can estimate a different measurement p.d.f., $p(z|\lambda)$.

Since the output of a state-dependent sensor measurement model in some embodiments is a p.d.f, one can use the p.d.f. in several ways. Some examples include sampling measurement values, computing the probability of a measurement z occurring, and calculating a central tendency and uncertainty of a measurement z (such as a mean and a variance).

State-dependent sensor measurement models also have a few other properties. The models can be used with many filtering algorithms (such as the Particle Filter). A learned model can be local to a sensor and, therefore, can be used on other platforms that employ the sensor the model learned from. A learned model can also be used in unknown environments as long as the state representation is sufficient enough to describe measurement bias and uncertainty. Looking beyond state estimation, the disclosed methods can also help identify states that may affect sensor measurement bias and uncertainty.

B. Learning State-Dependent Sensor Measurement Models

The models can learn to estimate a sensor's measurement p.d.f, $p(z|\lambda)$, through training on a collection of sensor measurements that were observed at a corresponding collection of states. Let $\Lambda=[\lambda_1, \lambda_2, \ldots, \lambda_N]$ represent a set where each member describes the states of a robot and the robot's environment. Let $Z=[z_1, z_2, \ldots, z_N]$ denote the set of sensor measurements where $z_q$ was observed at state $\lambda_q$. Let D represent a set that pairs the measurements, Z, with their corresponding states, $\Lambda$. That is, $D=[(z,\lambda)_1, (z,\lambda)_2, \ldots, (z,\lambda)_N]$ and its members are independently and identically distributed. And let $f(z|\lambda;w)$ denote a state-dependent sensor measurement model with trainable parameters, w. $f(z|\lambda;w)$ can learn to approximate $p(z|\lambda)$ through learning a set of parameters, w, that maximizes the likelihood of observing the data D. Written formally, the model can be trained by maximizing the likelihood function:

$$\mathcal{L}(w) = f(z_1, z_2, \ldots, z_N, \lambda_1, \lambda_2, \ldots, \lambda_N; w) = \prod_{q=1}^{N} f(z_q, \lambda_q; w) = \prod_{q=1}^{N} f(z_q | \lambda_q; w) f(\lambda_q) \quad (1)$$

where L(w) is the likelihood function, $f(z_q|\lambda_q;w)$ is the state-dependent sensor measurement model that is being trained, and $f(\lambda_q)$ is the prior distribution of the states set $\Lambda$. However, in practice one usually minimizes the negative log likelihood: $E=-\ln(L)$.

Since a state-dependent sensor measurement model learns directly from a sensor's measurements and the states at which the measurements were observed, the model parameters, w, also learn how the input state correlates with measurement bias and uncertainty. As a result, the trained models can learn to estimate conditional measurement bias and uncertainty. In addition to measurement uncertainty, learning measurement bias can be utilized because a priori, human-derived sensor measurement models do not capture how states and partial sensor calibrations affect measurement bias. As a result, these unmodeled correlations may cause a filtering algorithm to over- or underestimate measurement updates when correcting a robot's estimated state.

C. Mixture Density Networks

Figure 1:
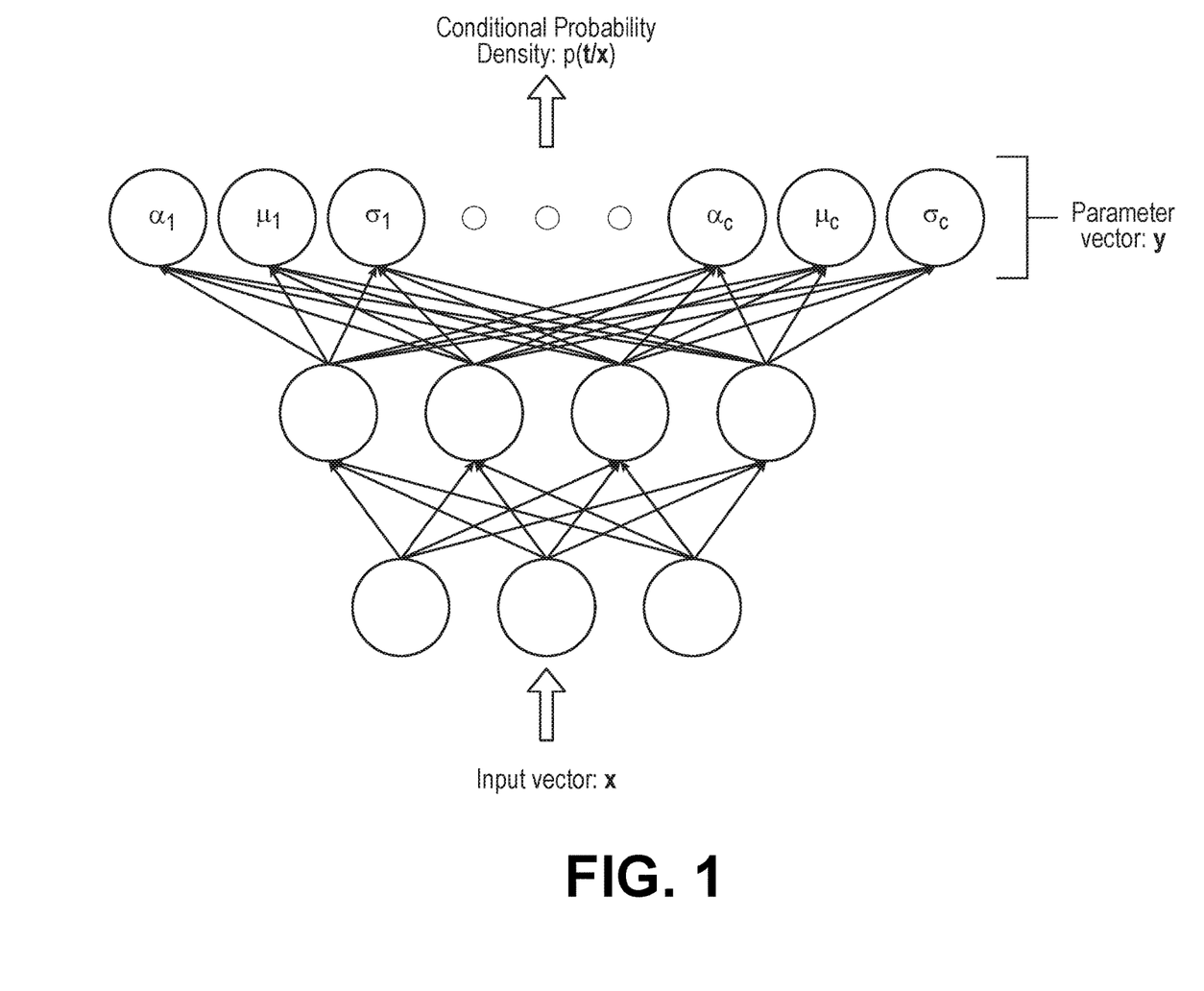
FIG. 1 illustrates an architecture of a mixture density network capable of generating an arbitrary probability distribution upon some input according to various example embodiments.

With reference to FIG. 1, shown is an illustration of an architecture for a mixture density network. This probabilistic model can generate an arbitrary probability distribution $p(t|x)$ conditioned upon some input x. A mixture density network (MDN) is a model that combines a feed-forward neural network with a mixture model. In an MDN, the mixture model can serve as the network's output layer and the network's output can be a parameter vector y. This parameter vector can contain a set of parameters that completely describe how the target data was generated. As a result, the mixture model layer can facilitate an MDN to represent arbitrary probability distributions of a desired quantity, t, conditioned upon an input x. Such probability distributions are defined by a linear combination of kernel functions and are mathematically expressed as:

$$p(t|x) = \sum_{i=1}^{C} \alpha_i(x) \phi_i(t|x) \quad (2)$$

where C is the number of kernel functions in the model, $\alpha_i(x)$ is the i-th mixing coefficient, $\Sigma_i \alpha_i(x)=1$, and $\phi_i(x)$ is the i-th kernel function. For simplicity, a Gaussian function can be used as a kernel. Therefore, our kernel function, $\phi_i(t|x)$, can be defined as:

$$\phi_i(t|x) = \frac{1}{(2\pi)^{d/2} \sigma_i(x)^d} \exp\left\{-\frac{\|t - \mu_i(x)\|^2}{2\sigma_i(x)^2}\right\} \quad (3)$$

where d is the number of dimensions in the vector t, and $\sigma_i(x)$ and $\mu_i(x)$ represent the conditional standard deviation and multivariate mean of the i-th Gaussian probability density (FIG. 1). $\sigma_i^2(x)$ can be referred to as a common variance and, unlike $\mu_i(x)$, the common variance can be limited to one dimension. Since the MDN can use a Gaussian kernel, the parameter vector y, the output of our MDN, can include a set of C conditional, Gaussian Mixture Model (GMM) parameters. Each set of GMM parameters can be represented with the variables $\alpha_i(x)$, $\mu_i(x)$, and $\sigma_i(x)$. In addition, since these conditional variables can completely describe a probability distribution $p(t|x)$, a collection of statistics about the distribution can be computed using the values in the parameter vector. Statistics can be calculated using an MDN

D. Learning Sensor Measurement Models with MDNs

A state-dependent sensor measurement model can be able to: 1) map from an input state space to a measurement space, 2) model how an input state can affect measurement bias and uncertainty, and 3) output an estimated sensor measurement p.d.f. MDNs can be used as state-dependent sensor measurement models because neural networks are regarded as universal function approximators and MDNs output a set of parameters that can completely describe a probability density function, both of which fulfill our needs. In various embodiments described herein, the input to an MDN, x, can be a state, λ, and the target, t, can be a measurement, z.

To learn a sensor's measurement p.d.f, an MDN can learn a set of parameters, w, that maximizes the likelihood of observing measurements Z at states Λ. With a set of measurements and their associated states, D, equation (1) can be used to find a set of parameters, w, that maximizes the likelihood. An MDN can be trained through minimizing the negative log-likelihood loss function, E.

$$\varepsilon = \sum_{q=1}^{N}\left(-\ln\left\{\sum_{i=1}^{C}\alpha_i(\lambda_q)\phi_i(z_q|\lambda_q)\right\}\right) \quad (4)$$

where the pair $(z_q, \lambda_q)$ is the q-th input state and observed measurement, and $\alpha_i(\lambda_q)$ and $\varphi_i(z_q|\lambda_q)$ represent the i-th mixture coefficient and Gaussian probability density function, respectively.

IV. Using State-Dependent Sensor Measurement Models for Localization

A. Extended Kalman Filter

With reference to the Extended Kalman Filter (EKF), it can be assumed that a person having ordinary skill in the art is familiar with the EKF, and will therefore the disclosure only describes the process model, the measurement model, and the other equations that collectively represent the EKF.

To describe the process and measurement model equations, it can be assumed that there is a robot with global pose x, a measurement z that observed a landmark with a signature s, and $u_k$, which denotes an odometry command $u_k$. The subscript k can be used to denote a time step during the algorithm's runtime.

As mentioned before, a standard Extended Kalman Filter algorithm is governed by a nonlinear process model, $x_k=f(x_{k-1}, u_k)+\varepsilon_k$, and a nonlinear measurement model, $z_k=h(x_k)+\delta_k$. The process model was defined as:

$$\hat{x}_k = \begin{bmatrix}\hat{x}_k \\ \hat{y}_k \\ \hat{\theta}_k\end{bmatrix} = \begin{bmatrix}x_{k-1} + v_k\cos(\theta_{k-1})\Delta t \\ y_{k-1} + v_k\sin(\theta_{k-1})\Delta t \\ \theta_{k-1} + \omega_k\Delta t\end{bmatrix} + \begin{bmatrix}\epsilon_k^x \\ \epsilon_k^y \\ \epsilon_k^\theta\end{bmatrix} \quad (5)$$

where $\hat{x}_k$ is a robot's current estimated state, $v_k$ and $\omega_k$ are components of an odometry command $u_k$, $x_{k-1}$ is a previous robot state, $\Delta t$ seconds is the amount of the command was executed for, and $\varepsilon_k=[\varepsilon^x_k, \varepsilon^y_k, \varepsilon^\theta_k]^T$ is the process noise. The process noise can be assumed to be Gaussian distributed with a mean of zero and a covariance of R. Using equation (5), we defined the Jacobian of the process model, $F_k$, as:

$$F_k = \begin{bmatrix}1 & 0 & -v_k(\theta_{k-1})\Delta t \\ 0 & 1 & v_k\cos(\theta_{k-1})\Delta t \\ 0 & 0 & 1\end{bmatrix} \quad (6)$$

The measurement model was specified with:

$$z_k = \begin{bmatrix}\rho_k^s \\ \phi_k^s\end{bmatrix} = \begin{bmatrix}\sqrt{(\Delta x^s)^2 + (\Delta y^s)^2} \\ \arctan 2((\Delta y^s), (\Delta x^s)) - \theta\end{bmatrix} + \begin{bmatrix}\delta_k^\rho \\ \delta_k^\phi\end{bmatrix} \quad (7)$$

where $\rho^s$ is the relative range measurement, $\varphi^s$ is the relative bearing measurement, and $\Delta x^s=(x^s-x)$ and $\Delta y^s=(y^s-y)$ are the position difference between a robot at position (x,y) and observed landmark s at position $(x^s, y^s)$. Like the process noise, the measurement noise, $\delta_k=[\delta_k^\rho, \delta_k^\varphi]^T$, is also assumed to be Gaussian distributed with a mean of zero and a covariance of Q. Using equation (7), $H_k$, the Jacobian of the measurement model, was:

$$H_k = \begin{bmatrix}\frac{\partial\rho^s}{\partial x} & \frac{\partial\rho^s}{\partial y} & 0 \\ \frac{\partial\phi^s}{\partial x} & \frac{\partial\phi^s}{\partial y} & -1\end{bmatrix} \quad (8)$$

and the elements of the Jacobian were computed as $$\frac{\partial\rho^s}{\partial x} = \frac{x - x^s}{\rho^s} \quad (9)$$

$$\frac{\partial\rho^s}{\partial y} = \frac{y - y^s}{\rho^s} \quad (10)$$

$$\frac{\partial\phi^s}{\partial x} = \frac{y^s - y}{(x^s - x)^2 + (y^s - y)^2} \quad (11)$$

$$\frac{\partial\phi^s}{\partial y} = -\frac{1}{(x^s - x) + \frac{(y^s - y)^2}{x^s - x}} \quad (12)$$

The full list of equations for the Extended Kalman Filter is as follows:

$$\hat{x}_k = f(x_{k-1}, u_k) \quad (13)$$

$$\hat{P}_k = F_k P_{k-1} F_k^T + R_k \quad (14)$$

$$v_k = z_k - h(\hat{x}_k) \quad (15)$$

$$S_k = H_k \hat{P}_k H_k^T + Q_k \quad (16)$$

$$K_k \times \hat{P}_k H_k^T S_k^{-1} \quad (17)$$

$$x_k = \hat{x}_k + K_k v_k \quad (18)$$

$$P_k = (I - K_k H_k)\hat{P}_k \quad (19)$$

where $\hat{x}_k$ is the estimated state after some action $u_k$, $\hat{P}_k$ and $P_k$ are the estimated and corrected state error covariance matrices (respectively), $v_k$ is the innovation, $S_k$ is the innovation covariance, $K_k$ is the Kalman gain, and $R_k$ and $Q_k$ are the process and measurement noise covariances, respectively.

B. Using State-Dependent Sensor Measurement Models with the EKF

In this section, the description includes information with respect to how to use state-dependent sensor measurement models with an Extended Kalman Filter (EKF). Although the description includes how to use mixture density networks (MDNs) as a state dependent measurement model, the discussion of how one can use an MDN with an EKF is included in Section V below.

Recall that an EKF's expected measurement can be computed with the measurement function, $Z_k=h(\lambda_k)+\delta_k$, and the uncertainty is represented with the covariance matrix, Q. If $f(z_k|\lambda_k;w)$ represents a trained state-dependent sensor measurement model, the trained model can be used in one of the following two approaches:

Approach 1: Using a state-dependent sensor measurement model's uncertainty with EKF. This method can use: 1) the a priori output function, $h(\lambda_k)$, to compute the expected measurement, $z_k$, and 2) $f(z_k|\lambda_k;w)$ to compute a conditional covariance of the expected measurement, $Q_k(\lambda_k)$.

Approach 2: Using a state-dependent sensor measurement model's expected measurement and measurement uncertainty with EKF. This method can use $f(z_k|\lambda_k;w)$ to compute the expected measurement, $z_k(\lambda_k)$, and the conditional covariance of the expected measurement, $Q_k(\lambda_k)$.

In both approaches, given an input state $\lambda_k$ the expected value and variance of $f(z_k|\lambda_k;w)$ can be used to calculate a conditional expected measurement $z_k(\lambda_k)$ and a conditional covariance of the measurement noise, $Q_k(\lambda_k)$, respectively. $Q_k(\lambda_k)$ is not the traditional static estimate of the measurement uncertainty, Q. Instead, $Q_k(\lambda_k)$ can vary depending on the state $\lambda_k$.

V. Evaluation and Results

A. Evaluation Dataset

Figure 2:
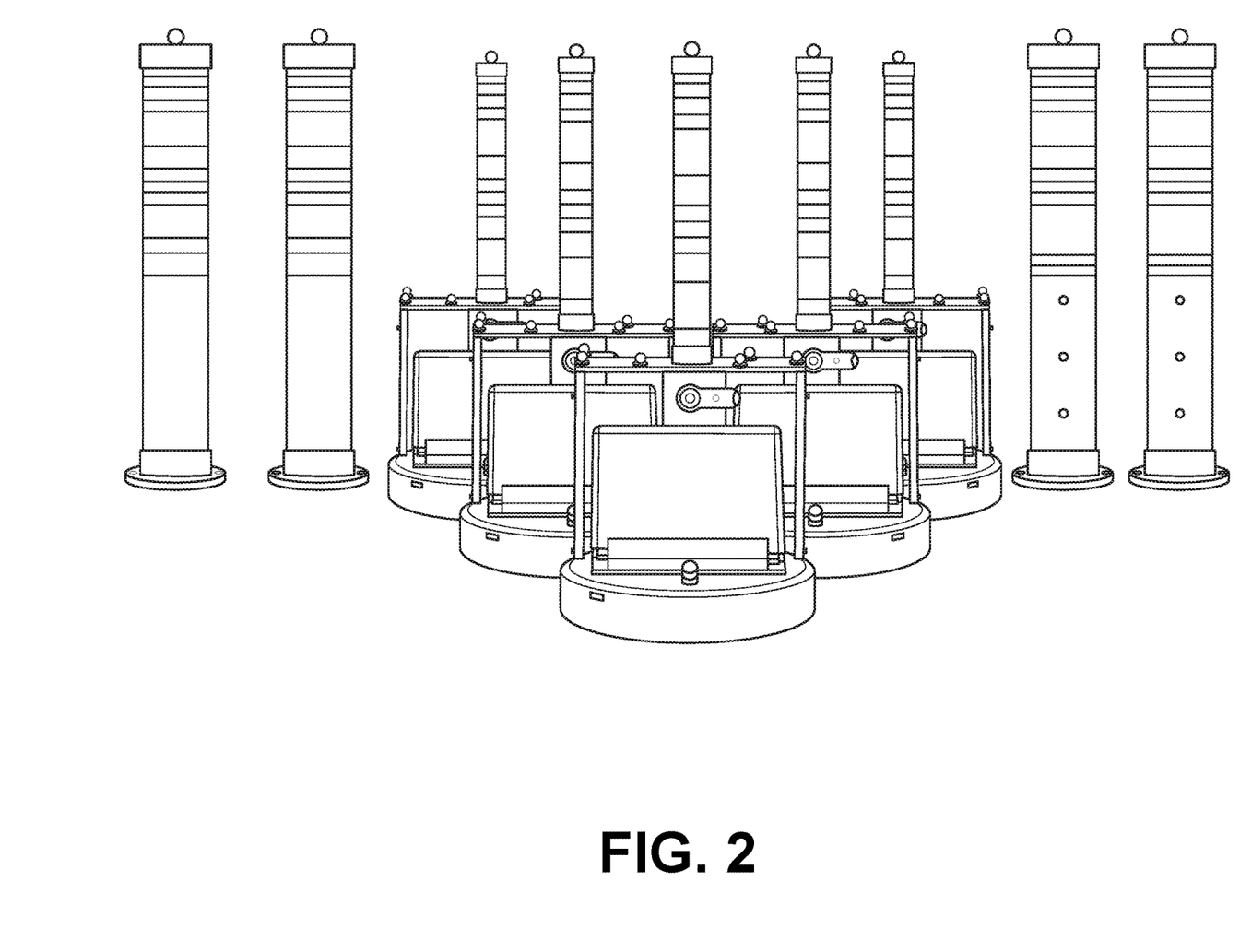
FIG. 2 illustrates robots and landmarks according to various embodiments of the present disclosure.

With reference to FIG. 2, shown is an illustration of robots and landmarks that can be used to collect data, such as, for example in the MR. CLAM experiments. The University of Toronto's Institute for Aerospace Studies' (UTIAS) multi-robot cooperative localization and mapping (MR.CLAM) dataset was used to compare the performance of our proposed method. The MR.CLAM dataset was collected in a static 15 m×8 m indoor, open-space environment during nine separate experiments. Each experiment utilized five iRobot Creates and 15 static, randomly-placed landmarks. During each experiment, all five robots arbitrarily and simultaneously moved throughout the open-space environment. The robots controlled their own movements using velocity commands, which were issued at a rate of 67 Hz. Each robot used its own onboard, monocular vision system to identify and measure the range and bearing to landmarks. A motion capture system, which was composed of ten Vicon cameras, also tracked the global position of each landmark and the global pose of each robot during each experiment. FIG. 2 illustrates the robots and landmarks that were used in each MR.CLAM experiment.

The MR.CLAM dataset is comprised of timestamped logs that were recorded by the motion capture system and the five iRobot Create robots. The motion capture system recorded timestamped logs of the global poses of each robot and the global position of each landmark during each experiment. Each robot recorded timestamped logs of its odometry commands and measurements. Each odometry command is composed of a linear velocity and an angular velocity. Each measurement is composed of a relative range, a relative bearing, and a signature, which is a numeric identifier that specifies the landmark that the robot observed. The robots in the MR.CLAM dataset observed both landmarks and other robots. But for the purposes of this disclosure, only the landmark-observed measurements were used.

In this dataset, the motion capture system and each robot recorded their logs independently of each other. Therefore, the motion capture logs and the logs from each individual robot do not have the same timestamps. Additionally, since each robot's odometry commands and measurements are recorded at different rates each robot's odometry log and measurement log also have different timestamps.

B. Training MDNs to Estimate MR.CLAM Measurement Models

Each robot's sensor measurement p.d.f., $p(z|\lambda)$, can be modeled with multiple single-component, univariate Gaussian Mixture Density Networks. In total, ten MDNs were trained where each of the five robots utilizes two MDNs. For each robot, one MDN can estimate the range measurement probability density, $f_\rho(\rho|\lambda;w)$, while the other MDN can estimate the bearing measurement probability density, $f_\varphi(\varphi|\lambda;w)$. Each robot can have its own pair of range and bearing MDNs because it can be assumed that the measurement probability functions amongst the five robots were not the same.

The input to the MDNs was the state vector, $\lambda$, that encoded information about a robot's state and the map of a robot's environment. Specifically, $\lambda=[\Delta x^s, \Delta y^s, \theta]$. Here, $\theta$ represents a robot's orientation. $\Delta x^s$ and $\Delta y^s$ represent the position difference between a robot and the landmark with signature s. The position difference was computed as $\Delta x^s=x^s-x$ and $\Delta y^s=y^s-y$ respectively. In this case, the robot pose (x, y, $\theta$) is the true pose that was collected by the MR.CLAM motion capture system.

The nine MR.CLAM experiments were divided into four subsets: training, validation, testing, and EKF evaluation. Experiments 2, 3, 8, and 9 were randomly selected for training, experiments 5 and 6 for validation, and experiments 4 and 7 for testing. Experiment 1 was not included in the training process. Since it was assumed that the measurement characteristics were not the same amongst the five robots, only the measurement and ground truth data for r-th robot were used to train, validate, and test its range and bearing MDNs. (For example, the first robot's measurement and ground truth data were only used to train its networks).

The ten MDNs have a homogeneous architecture. The architecture is a multi-layer perceptron and it composed of three layers in total. The first two layers have 25 units each and the third layer has a single-component, univariate Gaussian mixture layer with a Gaussian kernel. The first two layers used tan h as their activation function. To estimate the mixture coefficient $\alpha_k(x)$, mean $\mu_k(x)$, and standard deviation $\sigma_k(x)$ in the mixture layer, we used the softmax, linear, and exponential activation functions, respectively.

During training, the Adam optimizer was used with a learning rate of $10^{-3}$, but the rest of the optimizer parameters were left at their recommended values. Each network used equation (4) (the negative log-likelihood) as its loss function, trained for 30 epochs, and was regularized using an $L^2$ norm with a value of $10^{-3}$. To implement, train, and use the MDNs, the Keras neural network library was used with TensorFlow as its backend. Due to the number of parameters in the network, training each network took less than three minutes on a quad-core CPU running at 3.10 GHz.

The time complexity of each network during inference is $$o\left(\sum_{i=1}^{L-1} N_i + 3N_L\right) \quad (20)$$

where L is the number of layers, i is the index of a layer, $N_0$ is the input length (which is three in our case), and $N_i=(n_i n_{i-1}+2n_i)$ represents the number of operations needed to compute a linear combination and activation for $n_i$ neurons. The last term, $3N_L$, represents the number of operations required to compute the mixture layer output.

C. Using Trained MDNs with the Extended Kalman Filter

In Section IV-B, two methods were mentioned in which a trained, state-dependent sensor measurement model can be used with an Extended Kalman Filter. The first method only used a trained model to estimate the conditional uncertainty of the measurement noise, $Q_k(\lambda_k)$. And the second method used a trained model to estimate both the expected measurement, $z_k(\lambda_k)$, and the covariance, $Q_k(\lambda_k)$.

Here, let $f_\rho(\rho|_k; w)$ (with shorthand $f_\rho$) and $f_\varphi(\varphi|_k; w)$ (with shorthand $f_\varphi$) denote a trained range and bearing MDNs, respectively. As disclosed herein, both types of networks have one component, are univariate, and output a parameter vector y, which contains a conditional mean and a conditional standard deviation. (The parameter vector y also contains a mixture coefficient whose value will always be 1 since each network only has one component). For the first method, the EKF use equation (7) to compute the expected measurement $z_k$. However, here the EKF uses $f_\rho$ and $f_\varphi$ to compute the conditional covariance of the expected measurement, $Q_k(\lambda_k)$. $Q_k(\lambda_k)$ was computed as:

$$Q_k(\lambda) = \begin{bmatrix} [\hat{\sigma}_k^\rho(\lambda_k)]^2 & 0 \\ 0 & [\hat{\sigma}_k^\phi(\lambda_k)]^2 \end{bmatrix} \quad (21)$$

where $\hat{\sigma}_k^\rho(\lambda_k)$ and $\hat{\sigma}_k^\varphi(\lambda_k)$ are the conditional standard deviations from $f_\rho$ and $f_\varphi$ at time step k, respectively.

In the second method, the EKF uses $f_\rho$ and $f_\varphi$ to compute a conditional expected measurement $Z_k(\lambda_k)$ and a conditional covariance of the expected measurement, $Q_k(\lambda_k)$. $Z_k(\lambda_k)$ was calculated as:

$$z_k(\lambda) = \begin{bmatrix} \mu_k^\rho(\lambda_k) \\ \mu_k^\phi(\lambda_k) \end{bmatrix} \quad (22)$$

where $\mu_k^\rho(\lambda_k)$ and $\mu_k^\varphi(\lambda_k)$ are the conditional means of $f_\rho$ and $f_\varphi$ at time step k, respectively.

D. Computing Baseline Static Process and Measurement Covariances

To create an EKF baseline, the static process and measurement covariances can be computed for each robot in the MR.CLAM dataset. The process and measurement covariances can be derived from the training set that we used to learn measurement models in Section V-B.

Each robot's process covariance as $R=Cov(\lambda_k-\hat{X}_k)$ can be computed where R denotes the estimated process covariance, $X_k$ and $\hat{X}_k$ represent the collection of true and estimated poses, respectively. $X_k$ was gathered directly from the dataset. Each $\hat{X}_k$ was derived using equation (5) with odometry input, $u_k$, and previous true pose, $X_{k-1}$.

To compute the measurement covariance, any erroneous measurements were removed in which a robot identified the wrong landmark during an observation. Once the erroneous measurements were removed, each robot's measurement covariance was computed using $Q=Cov(Z^g_k-Z_k)\$$. Similar to the process covariance calculation, Q is the measurement covariance and $Z^g_k-Z_k$ represents the error between the ground truth measurements $Z^g_k$ and the observed measurements $Z_k$. The collection of observed measurements, $Z_k$, were gathered directly from the MR.CLAM dataset. However, $Z^g_k$ was calculated using equation (7) with (x,y,θ) as the robot's true pose at the time the measurement was observed and with ($x^s,y^s$) as the position of the identified landmark with signature s.

E. Localization Trial Setup 15 localization trial groups were created using all of the robot data from experiments 1, 4, and 7 in the MR.CLAM dataset. Each localization trial group consisted of every combination of an MR.CLAM experiment and a robot. Within each trial group, there were three trials and each trial employed one of the following conditions:

Condition 1: Standard EKF (sEKF). Trials with this condition served as the baseline for each trial group. This condition used equation (7) to compute a predicted measurement and a static, precomputed covariance of the measurement noise, Q. Q was computed in V-D.

Condition 2: EKF with MDN variance (EKF+MDN-$\sigma^2$). This condition employed Method #1 from 1V-B. Here, equation (7) computed a predicted measurement, while equation (21) estimated the covariance of the measurement noise, $Q_k(\lambda_k)$.

Condition 3: EKF with MDN mean and variance (EKF+MDN-$\mu\sigma^2$). This condition employed Method #2 from 1V-B. Here, equations (22) and (21) estimated the conditional predicted measurement $Z_k(\lambda_k)$ and the conditional covariance of the measurement noise $Q_k(\lambda_k)$, respectively.

Localization trial groups served as a mechanism for comparing the performance of each condition for a particular combination of a robot and an MR.CLAM experiment.

F. Results

The performance of the approaches (Conditions 2 and 3) can be compared with the baseline (Condition 1 using the results from the 45 localization trials). For the purpose of comparing the three conditions, the analysis can be focused on state estimates that occurred after measurement updates. This can be done because all other state estimates were the result of accumulated process (odometry) error. The performance of three measurement approaches can be compared, it is believed that the other state estimates would not provide useful comparisons in this context.

Figure 3:
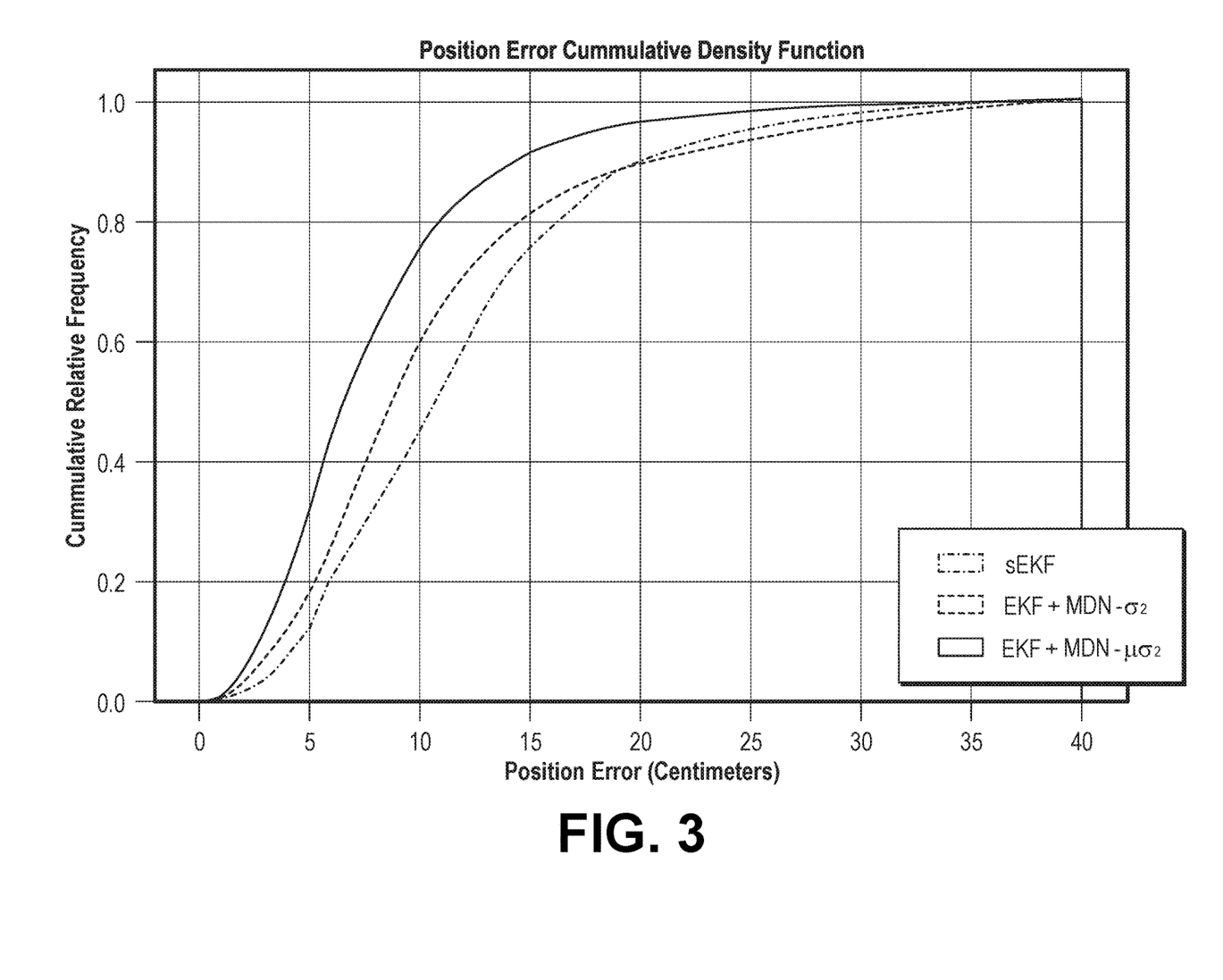
FIG. 3 is a graph of a cumulative distribution showing positions errors between the state estimates and the ground truths for example trials according to various embodiments of the present disclosure.

With reference to FIG. 3, shown is a cumulative distribution illustrating position errors between the state estimates and the ground truths for example trials. The performance of the conditions can be evaluated using three metrics: the cumulative position error of each condition, the relative performance between the sEKF and the MDN Conditions, and a statistical significance test. All the three metrics used the Euclidean distances (position error) between, $\hat{x}_k$, the robot estimated position from the filter, and, $x_k$, the true position from the MR.CLAM motion capture system, at time step k. For each combination of robot r and MR.CLAM experiment e, the position errors were computed as:

$$\eta_k^{c,r,e} = \sqrt{(x_k^{c,r,e}-\hat{x}_k^{c,r,e})^2 + (y_k^{c,r,e}-\hat{y}_k^{c,r,e})^2} \quad (23)$$

where $c \in \{1,2,3\}$ denotes the condition, $r \in \{1,2,3,4,5\}$ represents the robot, and $e \in \{1,4,7\}$ denotes the MR.CLAM experiment.

1) Position Error Cumulative Density: The first evaluation was looking at the position error cumulative density.

FIG. 3 illustrates a cumulative distribution of the position errors (in centimeters) for all 45 trials where each stylized line denotes one of the three conditions. Here, the faster a condition's curve ascends to a probability (cumulative relative frequency) of 1.0 the better the condition performed overall.

Figure 4A:
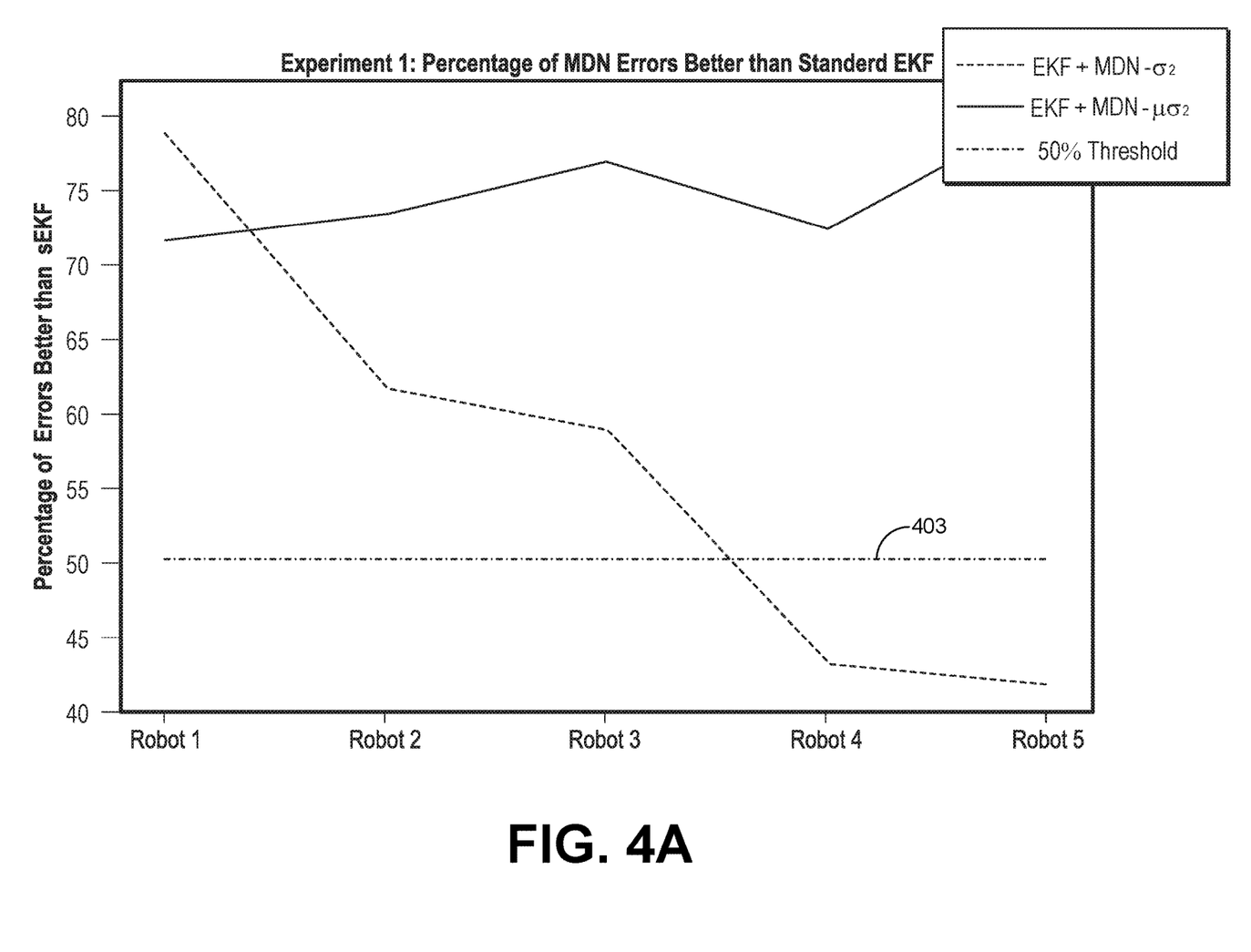
FIG. 4A-C are graphs showing how EKF+MDN-$\sigma^2$ and EKF+MDN-$\mu\sigma^2$ performed when compared with sEKF according to various example embodiments.
Figure 4B:
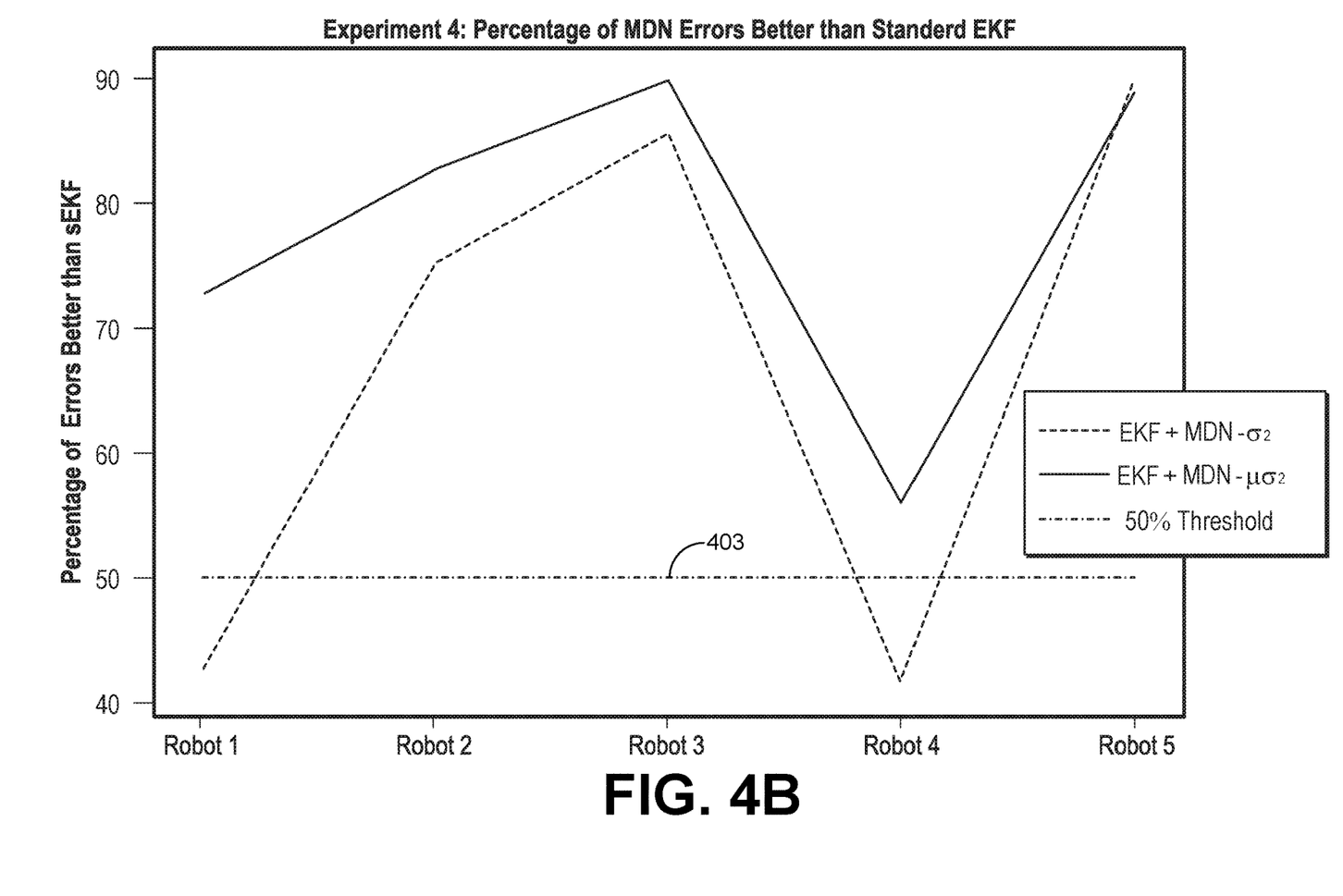
Figure 4C:
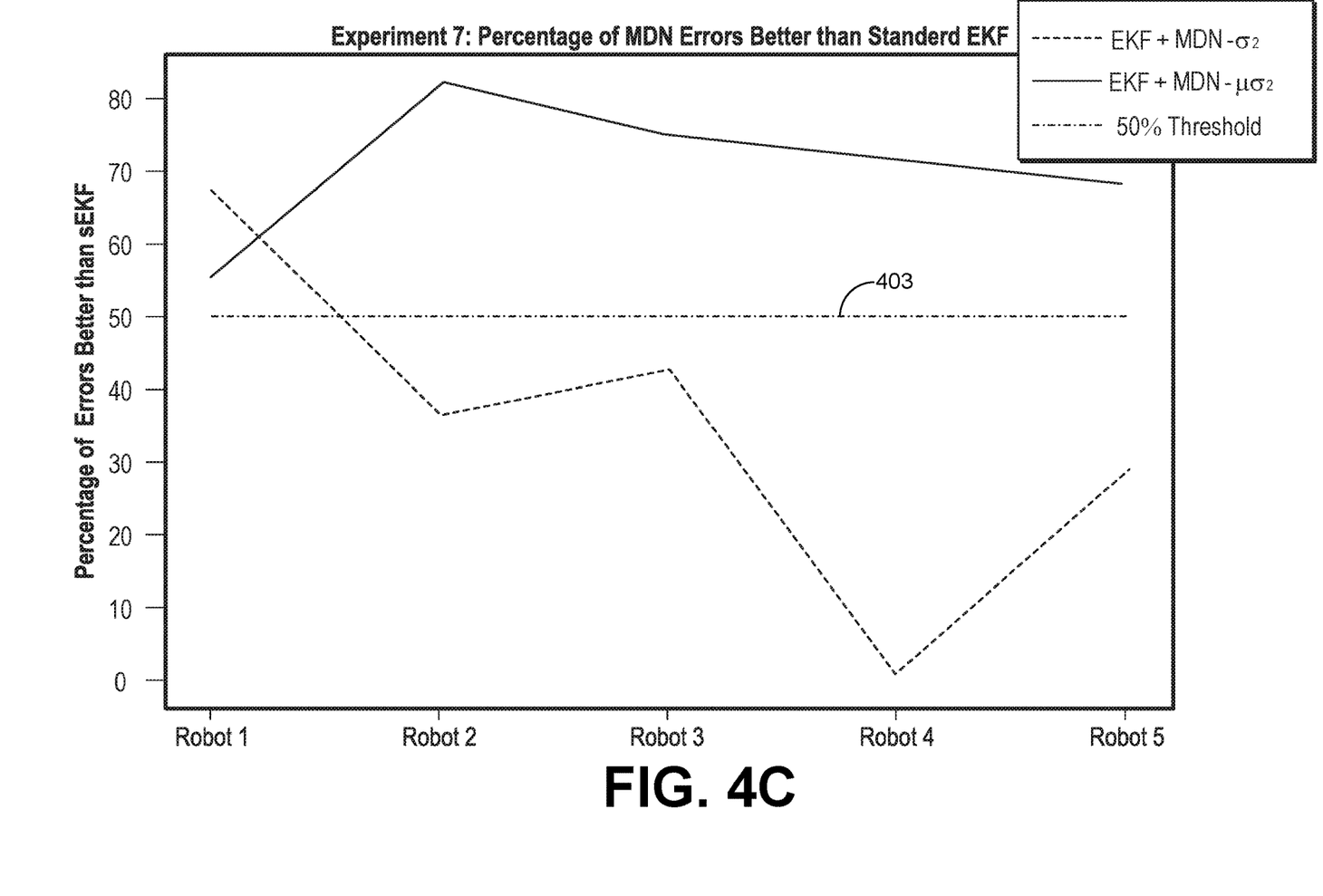

With reference to FIGS. 4A-4C, shown are graphs illustrating how the EKF+MDN-$\sigma^2$ and EKF+MDN-$\mu\sigma^2$ performed when compared with sEKF. If a point in any graph goes below the 50% black line, that means that trial performed either worse or no better than sEKF for that trial.

TABLE I

LOCALIZATION TRIAL POSITION ERROR STATISTICS

|  | EKF + MDN - $\sigma^2$ | EKF + MDN - $\mu\sigma^2$ |
|---|---|---|
| Avg. of means | 2.04 cm | −3.91 cm |
| Avg. of SD. | 1.13 cm | 0.37 cm |

2) Position Error Performance Relative to the Baseline: The second evaluation examined the performance of EKF+MDN-$\sigma^2$ and EKF+MDN-$\mu\sigma^2$ (Conditions 2 and 3) relative to sEKF, the baseline, qualitatively and quantitatively. For a qualitative evaluation, the percentage of EKF+MDN position errors that were better than sEKF was computed. For each localization trial group with robot r and MR.CLAM experiment e, the number of Condition 1 position errors that were worse than the corresponding Condition 2 and 3 position errors were counted. FIGS. 4A-C illustrate the result of our qualitative evaluation where the FIG. 4A, FIG. 4B, and FIG. 4C represent MR.CLAM experiments 1, 4, and 7 respectively. In FIGS. 4A-C, the line 403 serves as a performance threshold and determines how well EKF+MDN-$\sigma^2$ and EKF+MDN-$\mu\sigma^2$ compared with sEKF. Here, points above the threshold imply better performance, while points at or below the threshold imply worse.

For the quantitative evaluation, the relative average of the trial mean and standard deviation of the state position errors were calculated. To derive the two statistics, the mean and standard deviation of the state position error for each trial were calculated first. Then the means and standard deviations for Conditions 2 and 3 were subtracted from their corresponding baseline, Condition 1. Finally, the differences of the means and standard deviations were averaged for Conditions 2 and 3 to produce the statistics in Table I. Here, negative values indicate better performance when compared with sEKF.

3) Testing for Significance Amongst Conditions. A Kruskal-Wallis test can be performed to determine if there were significant differences among the medians of the three conditions. The results of the test are in Table II. The test, which was corrected for tied ranks, demonstrated there was a significance amongst the conditions. The test results were $\chi^2$ (2)=11,437.6, p=0.00, with a mean rank position error of 9.37e4 for sEKF, $8.31e4 for EKF+MDN-$\sigma^2$, and 6.38e4 for EKF+MDN-$\mu\sigma^2$.

Since the Kruskal-Wallis test showed significance, a Tukey post-hoc test was used, which was adjusted to control for error rate. An $\alpha$=0.05 was used for each of the three sub-analyzes. After this adjustment, the Tukey test showed that there were significant differences between each set of multiple comparisons.

G. Discussion

EKF+MDN-$\mu\sigma^2$ generally performed better than the other two conditions. From Tables I, it can be observed that EKF+MDN-$\mu\sigma^2$ had the smallest mean error across all localization trial groups. When FIG. 3 was examined, it was seen that EKF+MDN-$\mu\sigma^2$'s cumulative distribution (solid line) was consistently better than the other two distributions. In fact, almost 80% of the EKF+MDN-$\mu\sigma^2$ errors were at or below 10 centimeters, while less than 50% of the sEKF errors were at the same point. The latter point is especially interesting because it implies that the disclosed methods are less likely to collide with obstacles in that environment due to state estimation errors when the obstacles are within roughly a third of the robot's width.

The Extended Kalman Filter performed better when it used both the conditional mean and variance from the MDNs. Aside from the first point mentioned above, it can be noticed that EKF+MDN-$\sigma^2$ trials did not consistently perform better than sEKF trials. In fact, from FIGS. 4A-C, it can be determined that EKF+MDN-$\sigma^2$ only performed better than sEKF in 47% of the trial groups. This implies that EKF+MDN-$\sigma^2$ performance was effectively random compared with sEKF. However, it can be seen that EKF+MDN-$\mu\sigma^2$ performed better than sEKF in 100% of the trial groups. And since the main difference between EKF+MDN-$\mu\sigma^2$ and EKF+MDN-$\sigma^2$ is the use of the MDN means, the conditional means and variances are better used together with this particular application.

A state-dependent sensor measurement model is a parametric model that can learn a sensor's measurement probability density function, p(z|$\lambda$), and, as a result, it can estimate measurement bias and uncertainty. To demonstrate these methods, it was first described how one can use mixture density networks (MDNs) as state-dependent sensor measurement models and trained multiple MDNs on real measurement and state data from a mobile robot dataset. Then, the trained MDNs can be used as measurement models in the EKF, and it is demonstrated that the methods can outperform a standard EKF in a number of localization trials. A statistical significance test can be used to show that there was a significant difference between the proposed methods and a standard EKF.

Figure 5:
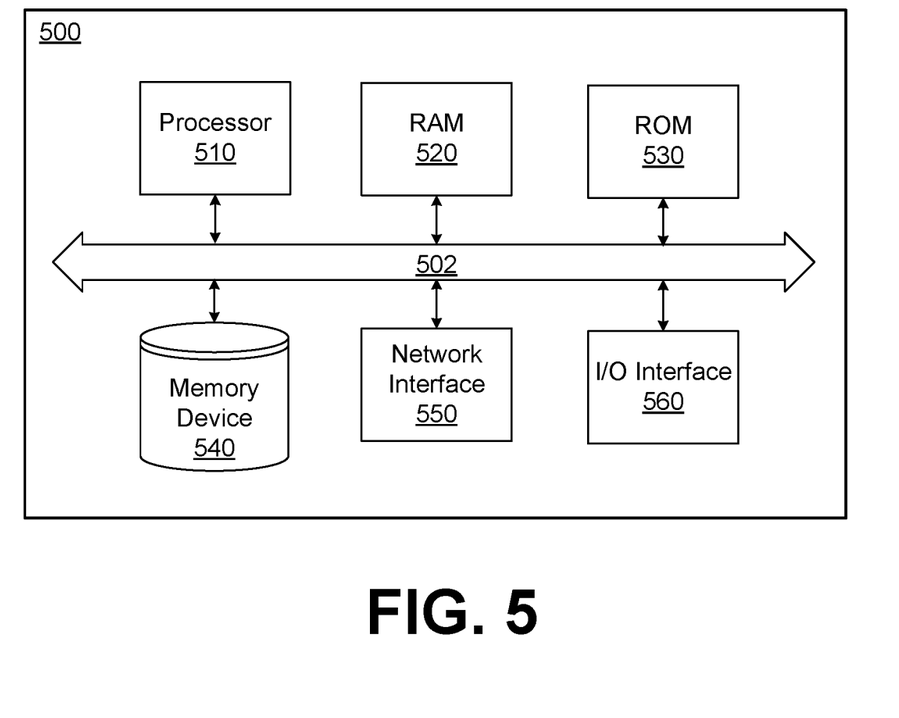
FIG. 5 is a schematic block diagram that illustrates an example computing device according to various embodiments.

Turning to FIG. 5, an example hardware diagram of a computing device 500 is illustrated. Any of the functionality discussed herein may be implemented, in part, using one or more elements of the computing device 500. The computing device 500 can include one or more of a processor 510, a Random Access Memory ("RAM") 520, a Read Only Memory ("ROM") 530, a memory device 540, a network interface 550, and an Input Output ("I/O") interface 560. The elements of the computing device 500 are communicatively coupled via a bus 502.

The processor 510 can include an arithmetic processor, Application Specific Integrated Circuit ("ASIC"), or other types of hardware or software processors. The RAM and ROM 520 and 530 can include a memory that stores computer-readable instructions to be executed by the processor 510. The memory device 530 stores computer-readable instructions thereon that, when executed by the processor 510, direct the processor 510 to execute various aspects of the present disclosure described herein. When the processor 510 includes an ASIC, the processes described herein may be executed by the ASIC according to an embedded circuitry design of the ASIC, by firmware of the ASIC, or both an embedded circuitry design and firmware of the ASIC. As a non-limiting example group, the memory device 530 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 550 can include hardware interfaces to communicate over data networks. The I/O interface 560 can include device input and output interfaces such as keyboard, pointing device, display, communication, and other interfaces. The bus 502 can electrically and communicatively couple the processor 510, the RAM 520, the ROM 530, the memory device 540, the network interface 550, and the I/O interface 560, so that data and instructions may be communicated among them.

In operation, the processor 510 is configured to retrieve computer-readable instructions stored on the memory device 540, the RAM 520, the ROM 530, or another storage means, and copy the computer-readable instructions to the RAM 520 or the ROM 530 for execution, for example. The processor 510 is further configured to execute the computer-readable instructions to implement various aspects and features of the present disclosure. For example, the processor 510 may be adapted and configured to execute the processes described above, including the processes described as being performed by various components herein.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A method of determining noise and bias for a sensor comprising:
   receiving, via at least one computing device, an input vector;
   generating, via the at least one computing device, a parameter vector based at least in part on a feed-forward neural network;
   determining, via the at least one computing device, a plurality of components using the parameter vector based at least in part on a mixture model; and
   generating, via the at least one computing device, a conditional probability density function based at least in part on the plurality of components, wherein the noise and bias for the sensor is determined based at least in part on the conditional probability density function.

2. The method of claim 1, wherein the input vector corresponds to a vector encoding information about a state corresponding to the at least one computing device.

3. The method of claim 1, wherein the at least one computing device corresponds to a robot and the method further comprises generating a map of an environment of the robot.

4. The method of claim 1, further comprising training, via the at least one computing device, the mixture model using a collection of sensor measurements and at least one environment state when the collection of sensor measurements was produced.

5. The method of claim 1, wherein the noise is Gaussian distributed.

6. The method of claim 1, wherein the conditional probability density function is based at least in part on an Extended Kalman Filter.

7. A system comprising:
   a memory device; and
   at least one computing device in communication with the memory device, the at least one computing device configured to at least:
   receive an input vector;
   generate a parameter vector based at least in part on a feed-forward neural network;
   determine a plurality of components using the parameter vector based at least in part on a mixture model;
   generate a conditional probability density function based at least in part on the plurality of components; and
   generate a noise and a bias for a sensor based at least in part on the conditional probability density function.

8. The system of claim 7, wherein the plurality of components comprise at least one set of conditional Gaussian Mixture Model (GMM) parameters.

9. The system of claim 7, wherein the input vector corresponds to a vector encoding information about a state corresponding to the at least one computing device.

10. The system of claim 7, wherein the at least one computing device corresponds to a robot and the at least one computing device is further configured to at least generate a map of an environment of the robot.

11. The system of claim 7, wherein the at least one computing device is further configured to at least train the mixture model using a collection of sensor measurements and at least one environment state when the collection of sensor measurements was produced.

12. The system of claim 7, wherein the noise is Gaussian distributed.

13. The system of claim 7, wherein the conditional probability density function is based at least in part on an Extended Kalman Filter.

14. A non-transitory computer-readable medium embodying a program that, when executed by at least one computing device, causes the at least one computing device to at least:
   receive an input vector;
   generate a parameter vector based at least in part on a feed-forward neural network;
   determine a plurality of components using the parameter vector based at least in part on a mixture model;
   generate a conditional probability density function based at least in part on the plurality of components; and
   generate a noise and a bias for a sensor based at least in part on the conditional probability density function.

15. The non-transitory computer-readable medium of claim 14, wherein the plurality of components comprise at least one set of conditional Gaussian Mixture Model (GMM) parameters.

16. The non-transitory computer-readable medium of claim 14, wherein the input vector corresponds to a vector encoding information about a state corresponding to the at least one computing device.

17. The non-transitory computer-readable medium of claim 14, wherein the noise is Gaussian distributed.

18. The non-transitory computer-readable medium of claim 14, wherein the at least one computing device corresponds to a robot and the program further causes the at least one computing device to at least generate a map of an environment of the robot.

19. The non-transitory computer-readable medium of claim 14, wherein the program further causes the at least one computing device to at least train the mixture model using a collection of sensor measurements and at least one environment state when the collection of sensor measurements was produced.

20. The non-transitory computer-readable medium of claim 14, wherein the conditional probability density function is based at least in part on an Extended Kalman Filter.

* * * * *